United States Patent
Monks et al.

(10) Patent No.: US 7,631,111 B2
(45) Date of Patent: *Dec. 8, 2009

(54) SYSTEM METHOD FOR RAPIDLY CHARGING USB DEVICE'S BATTERY WHEREIN USB DEVICE REQUESTS CHARGING THE BATTERY AT A HIGHER POWER LEVEL

(75) Inventors: Morgan H. Monks, Tempe, AZ (US); Mark R. Bohm, Village of Bear Creek, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/465,189

(22) Filed: Aug. 17, 2006

(65) Prior Publication Data

US 2008/0042616 A1  Feb. 21, 2008

(51) Int. Cl.
G06F 3/00 (2006.01)
G06F 1/00 (2006.01)
(52) U.S. Cl. .............. 710/15; 710/8; 710/16; 710/18; 710/19; 713/300; 713/340
(58) Field of Classification Search .......... 710/15, 710/8, 16, 18, 19; 713/300, 340
See application file for complete search history.

(56) References Cited

U.S. PATENT DOCUMENTS

| | | | |
|---|---|---|---|
| 5,884,086 A * | 3/1999 | Amoni et al. ......... | 713/300 |
| 6,184,652 B1 | 2/2001 | Yang | |
| 6,253,329 B1 * | 6/2001 | Kang .................... | 713/300 |
| 6,308,239 B1 | 10/2001 | Osakada et al. | |
| 6,531,845 B2 | 3/2003 | Kerai et al. | |
| 6,532,512 B1 | 3/2003 | Torii et al. | |
| 6,541,879 B1 * | 4/2003 | Wright .................. | 307/31 |

(Continued)

FOREIGN PATENT DOCUMENTS

EP  0 982 663 A2  3/2000

(Continued)

OTHER PUBLICATIONS

Compaq et al. "Universial Serial Bus Specification Revision 2.0" Apr. 27, 2000, p. 171-177.*

(Continued)

Primary Examiner—Tammara Peyton
(74) Attorney, Agent, or Firm—Meyertons Hood Kivlin Kowert & Goetzel, P.C.; Jeffrey C. Hood (57) ABSTRACT

System and method for enumerating and/or enumerating a device. The device may be a USB portable device which adheres to a first standard, e.g., the USB specification, and may engage in enumeration with respect to a USB hub/USB host device. Where a battery included in the device is sufficiently low, the device may engage in low power enumeration, e.g., to begin charging the device using enumerated power. Low power enumeration may allow the device to enumerate even when the device is incapable of powering on. Additionally, or alternatively, the device may determine whether the hub/host device is capable of providing high power charging. If it is, the device may begin charging the battery of the device using power provided by the hub/host device at a high power level.

12 Claims, 6 Drawing Sheets

U.S. PATENT DOCUMENTS

| | | | |
|---|---|---|---|
| 6,622,195 | B2 | 9/2003 | Osakada et al. |
| 6,665,801 | B1 * | 12/2003 | Weiss .......................... 713/300 |
| 6,732,218 | B2 | 5/2004 | Overtoom et al. |
| 6,798,173 | B2 * | 9/2004 | Hsu ............................ 320/134 |
| 6,946,817 | B2 * | 9/2005 | Fischer et al. ............... 320/132 |
| 7,017,055 | B1 * | 3/2006 | Ho .............................. 713/300 |
| 7,170,259 | B2 | 1/2007 | Veselic |
| 7,271,568 | B2 * | 9/2007 | Purdy et al. ................. 320/106 |
| 7,310,697 | B2 * | 12/2007 | Pandit et al. ................ 710/313 |
| 7,373,528 | B2 * | 5/2008 | Schindler .................... 713/300 |
| 7,421,594 | B2 * | 9/2008 | Nakajima et al. ........... 713/300 |
| 7,523,338 | B2 * | 4/2009 | Fu et al. ..................... 713/340 |
| 2004/0221180 | A1 * | 11/2004 | Enami et al. ................ 713/300 |
| 2004/0239294 | A1 | 12/2004 | Veselic |
| 2004/0251878 | A1 * | 12/2004 | Veselic ....................... 320/141 |
| 2005/0144495 | A1 * | 6/2005 | Nakajima et al. ........... 713/340 |
| 2005/0174094 | A1 * | 8/2005 | Purdy et al. ................. 320/134 |
| 2006/0095641 | A1 * | 5/2006 | Pandit et al. ................ 710/313 |
| 2006/0112288 | A1 * | 5/2006 | Schindler .................... 713/300 |
| 2006/0181241 | A1 | 8/2006 | Veselic |
| 2006/0287007 | A1 * | 12/2006 | Veselic et al. ............... 455/572 |
| 2007/0022311 | A1 * | 1/2007 | Park ............................ 713/310 |
| 2007/0143505 | A1 * | 6/2007 | Terrell ......................... 710/10 |
| 2007/0220287 | A1 * | 9/2007 | Sang-Heon ................. 713/300 |

FOREIGN PATENT DOCUMENTS

| | | |
|---|---|---|
| GB | 2352540 | 1/2001 |
| JP | 2000-242377 | 9/2000 |
| JP | 2001-043178 | 2/2001 |
| KR | 10-2004-0008365 A | 1/2004 |
| KR | 10-0490068 B1 | 5/2005 |

OTHER PUBLICATIONS

"USB MulitSwitch Hub"; SMSC Datasheet; Jun. 17, 2006; 57 pages; Standard Microsystems Corp., Hauppauge, NY.

Monks, Morgan, Mark R. Bohm, U.S. Appl. No. 11/465,189, "System and Method for Fapidly Charging a USB Device", Aug. 17, 2006.

"LM3658 Dual Source USB/AC Li chemistry Charger IC for Portable Applications"; Datasheet; May 2005; 14 pages; National Instruments Corporation; Austin, TX.

Terry Remple, Megan Hayes, and Dave Wilson; "CEA-936-A USB Carkit Specification"; Aug. 11, 2005; 93 pages; Consumer Electronics Association (CEA) R6 Mobile Electronics Committee.

Carlson, Brian; "SmartReflex Power and Performance Management Technologies", Texas Instruments, 2005.

"Wireless Handsets: TWL4030", Texas Instruments, online at http://focus.ti.com/general/docs/wtbu/wtbugencontent.tsp?templateld=6123&contentld=4634&DCMP=WTBU&HQS=ProductBulletin+OT+twl4030. 2005 Ti, Inc.

"Programmable Multi-Host Device Sharing USB Hub"; IBM Research Disclosure; Feb. 1999; vol. 418, No. 92; Mason Publications, Hampshire, GB.

* cited by examiner

SYSTEM METHOD FOR RAPIDLY CHARGING USB DEVICE'S BATTERY WHEREIN USB DEVICE REQUESTS CHARGING THE BATTERY AT A HIGHER POWER LEVEL

FIELD OF THE INVENTION

The present invention relates to the field of Universal Serial Bus (USB) hubs, and more particularly to a system and method for rapidly charging a USB device.

DESCRIPTION OF THE RELATED ART

In recent years, there has been a proliferation of portable USB devices that utilize power provided by a battery. For example, many people own or purchase various portable devices such as cell phones, music players, video players, and laptops, among other devices.

In using such portable devices, users often require that they be easily recharged, e.g., using various electrical outlets, e.g., in a house or car. Most users that own or purchase these devices also own host device(s), e.g., a computer, which supports USB communication/devices. In such cases, it is often convenient to charge the portable devices using power supplied by the host device, e.g., using the USB connection.

However, when the battery of the portable device is depleted, e.g., when the battery is "dead", the portable devices are often unable to enumerate with the USB host in order to charge. Enumeration refers to the process of a host device establishing communication with the device, e.g., the USB device. More specifically, if the portable devices do not have enough power to engage in enumeration, the portable devices may not be allowed to charge at enumerated power. "Charging at enumerated power" oftentimes is desirable because current standards, e.g., the USB specification, do not allow the device to draw very much current until the device is enumerated. Under the current specification, the portable devices may not use more than 100 milliamps (mA) to charge the battery until after enumeration.

Some current systems overcome this problem by supplying power to the USB device in excess of those power levels described in the USB specification. However, these systems do not comply with the specification and may be subject to having their power source removed, e.g., by the host device. Thus, improvements in enumeration and USB battery charging would be desirable.

SUMMARY OF THE INVENTION

Various embodiments of a system and method for rapidly charging of a device are described herein.

According to various embodiments, the device may be rapidly charged according to the following method. However, it should be noted that the method elements described may be performed concurrently, in a different order than shown, or may be omitted. Also, additional method elements may also be performed as desired.

Coupling of the device may be detected, e.g., to the hub. The detection may be performed by the hub and/or by the device, e.g., using logic circuitry included in one or both of the device and the hub. The detection may be performed by detecting various electrical changes in circuits, e.g., changes in resistance in the line of the cable connecting the device and the hub. For example, the device may detect the coupling by detecting the provision of power on the VBUS line by the host device. Additionally, the host device may detect the coupling of the device by detecting a signal transmitted by the device. However, the described methods for detection are exemplary only and other methods are envisioned.

The device may be a USB device, e.g., a cell phone, a music or video player, a peripheral device, and/or other devices described herein, among others. In some embodiments, the host device may include various computer systems, other systems/devices, etc. The device may include a battery, at least one port, and logic circuitry (described in more detail below), and may adhere to a first standard, e.g., the USB specification. In some embodiments, the first standard may specify provision of maximum power to the device at a first power level. The first power level may be approximately 500 mA or less, e.g., supplied to the device 100A after enumeration.

Additionally, the hub may take on a variety of forms, e.g., actively powered USB hubs, possibly included in various devices such as display devices (e.g., cathode ray tube (CRT) monitors, liquid crystal display (LCD) screens, plasma screens, etc.). In some embodiments, the hub may be an internal actively USB hub, e.g., powered by power supplies in a host device (e.g., a computer system), an external USB hub, and/or any other type of hub which is operable to provide power in excess of the first power level.

More specifically, in one embodiment, the hub may be powered by a power source, e.g., a power supply of the computer system. However, in such embodiments, the power supply of the computer system may not be monitored, e.g., according to the VBUS limits stipulated by the USB specification. This may allow the device to draw power greater than the first power level without the computer system restricting power supplied to the device. For example, in one embodiment, the hub may not be a hub that is passively powered by the motherboard of a computer, but may instead be powered directly from the power supply of the computer system, e.g., similar to the powering of hard drives/other devices coupled to the power supply.

Additionally, the hub may include one or more downstream ports, e.g., to couple to one or more devices, relay circuitry operable to relay power from a power source to charge the battery of the device, and/or logic circuitry to determine appropriate device behavior. Thus, according to various embodiments, the device, the hub, and the host device may be any of various appropriate devices, among other systems/devices.

Thus, according to various embodiments, coupling of the device, e.g., to a hub, may be detected; additionally, the device and the hub may be any of numerous appropriate systems, such as those described above, among others.

The method, e.g., the device and/or the hub (e.g., using the logic circuitry of one or both of the device and the hub), may determine whether the device should receive high-power charging of the battery. The determination may be performed by detecting a charge state of the battery. Where the battery is sufficiently "dead" or too low to power on the device, the device may request or be in need of high-power charging. Note that because the battery is dead, the device may make the described determinations and produce signals using power provided by the hub, e.g., using the VBUS line in the USB cable.

However, other conditions, e.g., other than depletion of the battery, may be used to determine whether the device/battery of the device should receive high-power charging. For example, the user may choose an option, e.g., on the device and/or the hub which indicates that the device should be charged using high-power. Alternatively, or additionally, the device may automatically determine that the device should receive high-power charging, e.g., according to various states of the device, including, for example, state of charge of the battery, whether the device is powered on, usage statistics of the device, whether the device is currently in use, or other variables/conditions. Thus, in some embodiments, this determination may be made by the device and/or the hub, e.g., in response to input and/or automatically.

Where the device should receive high-power charging, the device may send a signal to the hub requesting high power charging, e.g., by using a pullup or pulldown resistor and/or changing the current of one or more connections between the device and the hub. Accordingly, the hub may respond to the signal with its own signal indicating that the hub is capable of high power charging. Additionally, the hub may not begin the enumeration process with the device in order to allow high-power charging (e.g., charging the device using power greater than the first power level, e.g., 500 mA).

Thus, according to various embodiments, the device and the hub may operate to signal to each other that they require and/or are operable to provide high-power charging. Upon communicating this information, power may be provided to the device at a second power level to charge the battery. Note that during this process as well as during high-power charging, the device may not be enumerated, e.g., so that the host device is "unaware" of its presence. This provision of power may be supplied based on the determination described above, e.g., whether the device should receive high-power charging. Additionally, the second power level may be greater than the first power level, e.g., greater than 500 mA. Said another way, the high-power charging may include charging the battery of the device using power levels greater than the enumerated power levels described in the USB specification. In some embodiments, the second power level may be approximately 1.5 amps (A). Thus, according to various embodiments, power in excess of the first power level may be provided to the device 100A.

In some embodiments, the method may include monitoring the charge state of the battery, e.g., periodically or continuously, among other methods. When the charge state of the battery reaches sufficient levels for enumeration, the device may initiate an enumeration request, e.g., with the hub and/or the host device. This enumeration may allow the device to be used and charged at the first power level, e.g., approximately 500 mA. This enumeration may occur automatically, e.g., without any input from the user, upon input from the user or otherwise, or not at all, among other scenarios, as desired. Thus, according to various embodiments, where the device is sufficiently charged, the device may be enumerated with respect to the host device when available.

Additionally, or alternatively, the method may include monitoring the charge state of the battery to determine whether the charge state is sufficient to power on the device. This may be done in response to user input or automatically, among other methods, as desired. Additionally, in some embodiments, monitoring the charge state for powering on the device/enumerating the device may be substantially the same power level/method for monitoring. Thus, according to various embodiments, the charge state of the battery may be monitored to determine whether the device can be powered on and/or enumerated. Correspondingly, the device may be powered on and/or enumerated as desired.

Additionally, the device may be operable to use a portion of the power supplied by the hub to power on the device, e.g., the SoC or device circuitry of the device. This may be performed automatically or in response to input as desired. For example, where the device is a music player, the user may be able to turn on the device and play music, e.g., even during high-power charging. Thus, at least a portion of the power provided by the hub may be used to operate the device. Note that any remaining power may be used to continue to charge the battery, among other uses.

If the device should not receive high-power charging, e.g., as determined by the device and/or the hub (among others), the device may be enumerated with respect to host device. The battery of the device may still be charged when enumerated, but possibly at a lower power level, e.g., the first power level. In some embodiments, the logic circuitry of the device may initiate the enumeration of the device, e.g., after determining if the device requires enumeration and/or power for charging of the battery. Correspondingly, after enumeration, the logic circuitry may also initiate battery charging of the battery using enumerated power, e.g., at the first power level. Thus, where the device does not need high-power charging, the hub and the device may conjunctively operate to perform enumeration, e.g., with respect to the host device.

Thus, according to various embodiments, a device may be charged using high-power by a hub as desired.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 1:
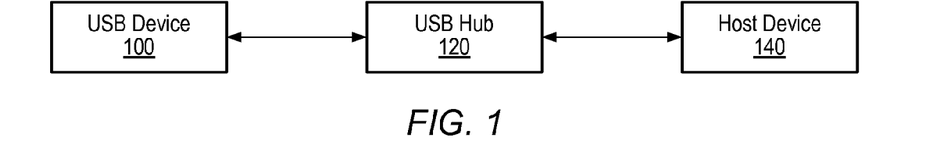
FIGS. 1-3 illustrate exemplary systems suitable for implementing various embodiments of the invention.
Figure 2:
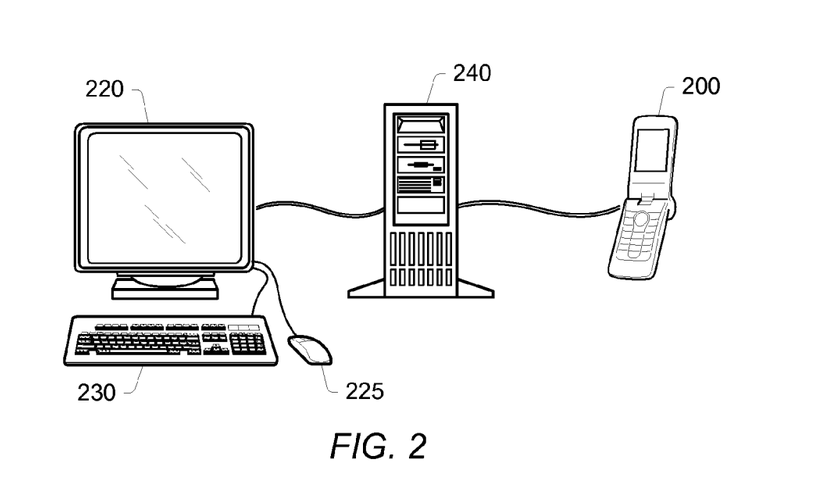
Figure 3:
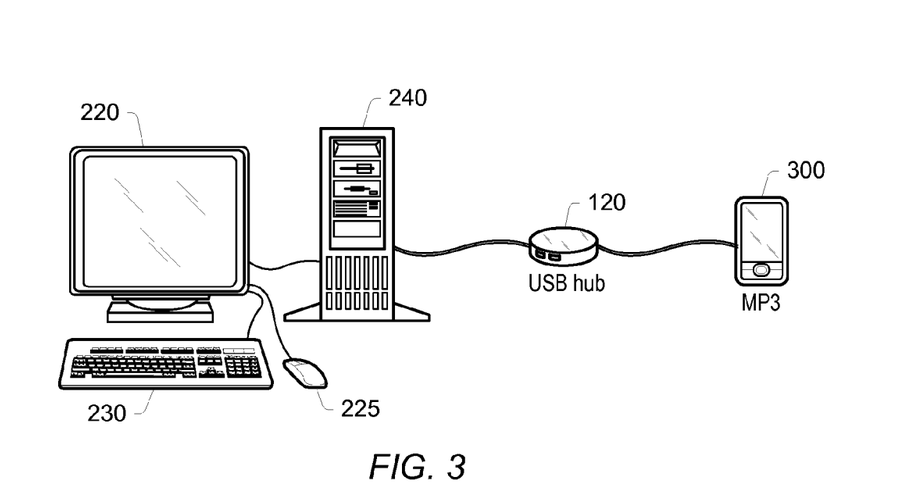

FIGS. 1-3—Exemplary Systems

FIG. 1 illustrates one embodiment of an exemplary system operable to enumerate a USB device 100 and/or charge the battery of the USB device 100. As shown, the USB device 100 may be coupled to host device 140, e.g., via a USB hub 120. Note that in some embodiments one or more of the elements shown in FIGS. 1-3 may be omitted, e.g., the host device 140 and/or the USB hub 120, among others. For example, the USB device 100 may be coupled directly to the host device 140, e.g., without the USB hub 120 (e.g., for low-power enumeration, described below). Alternatively, the USB device 100 may only be coupled to the USB hub 120; such embodiments may allow the USB device 100 to be charged via the USB hub 120 (e.g., for high power charging, described below).

Note that the above-described connections/configurations are exemplary only and other configurations are envisioned. More specifically, the low-power enumeration and high-power charging embodiments are not limited to the exemplary configurations described above. For example, the high-power charging may include the host device 140, and/or the USB hub 120 may be omitted or included in the host device 140 as desired. Similarly, the low-power enumeration may be performed by systems which include the USB hub 120. Thus, in various embodiments, the USB device 100 may be coupled to the USB hub 120 and/or the host device 140 via a variety of methods.

The USB device 100 may be any of numerous devices. For example, the USB device 100 may be a cell phone (e.g., cell phone 200 illustrated in FIG. 2), a personal music player (e.g., player 300 illustrated in FIG. 3, e.g., an mp3 player, and/or an IPOD™, among other players, a CD player, etc.), a personal video player (e.g., the player 300 illustrated in FIG. 3, e.g., a digital video player, a DVD player, etc.), a peripheral device (e.g., a printer), an input device (e.g., a game controller, touchpad, mouse, and/or keyboard, among others), or any other device that requires battery charging. Thus, the USB device 100 may be any of a variety of appropriate devices.

Additionally, the host device 140 may be any of various host devices; more specifically, the host device 140 may be a computer system, e.g., such as computer system 240 illustrated in FIGS. 2 and 3, a USB hub, e.g., an external USB hub or one included in an electronic system (e.g., the computer system 240 or display device 220, among others), and/or other types of host devices, e.g., ones that provide power for charging the USB device 100. Alternatively, or additionally, the host device 140 may be a second USB device, e.g., similar to the USB device 100, among others. For example, in one embodiment, the second USB device may be a USB on-the-go (OTG) device which may be operable to act as a host and a device, e.g., depending on the situation. Thus, according to various embodiments the host device 140 may be any of various appropriate devices.

In some embodiments, the USB hub 120 may be a passively powered device, e.g., where the USB hub 120 receives power provided by the host device 140 (e.g., the motherboard of the computer system 240), and/or an actively powered device, e.g., where the USB hub 120 receives power from a power source, e.g., a wall socket, a battery (such as, for example, of an automobile, e.g., from the lighter of the automobile), and/or other power supplies (e.g., a power supply of the host device 140, e.g., of the computer system 240). More specifically, in one embodiment, actively powered may mean that the USB hub 120 is powered from a power source which will not limit the consumption of power by the USB device, e.g., limit the consumption according to a standard, such as, for example the USB specification. In some embodiments, the USB hub 120 may include one or more ports for coupling to various devices, e.g., the USB device 100 and/or the host device 140. Thus, the USB hub 120 may be powered actively and/or passively and provide communications between a host device and a device, among other capabilities.

As shown in FIGS. 2 and 3, the computer system 240 may include/couple to the display device 220 operable to display video signals received from the computer system 240 and/or to act as a USB hub. In other words, the display device 220 may act as the USB hub 120 as well as displaying video signals from the host device 140 (e.g., the computer system 240). Additionally, the computer system 240 may include keyboard 230 and mouse 225 which may be USB device. Keyboard 230 and mouse 225 may couple to the computer system 240 in a variety of ways, e.g., directly to the computer 240 or via the USB hub included in the display device 220, among other methods. Thus, in FIGS. 2 and 3, the keyboard 230 and mouse 225 are shown coupled to the display 220, which may act as a USB hub. Alternatively, the keyboard 230 and mouse 225 may be coupled to the computer system 240, e.g., a hub in the computer system 240.

Additionally, the computer system 240 may include at least one memory medium on which one or more computer programs or software components may be stored. For example, the memory medium may store operating system software, as well as other software for operation of the computer system 240. Various embodiments further include receiving or storing instructions and/or data implemented in accordance with the foregoing description upon a carrier medium. Note that the above descriptions of the host device 140, the USB device 100, the computer system 240 (and components therein, e.g., input devices), and the display device 220 are exemplary only and other components and systems are envisioned.

As shown in FIG. 2, the cell phone 200 (e.g., the USB device 100) may couple to the computer system 240 (e.g., the host device 140). More specifically, in some embodiments, the USB device 100, e.g., the cell phone 200, may couple to a hub included in the computer system 240. Thus, in some embodiments, the USB device 100 may couple directly to a USB port included in the computer system 240. However, as noted above (and shown in FIG. 3), the USB device 100 may couple indirectly, e.g., through USB hub 120 or other devices.

In the example shown in FIG. 3, the player 300 may be coupled to the USB hub 120 which may in turn be coupled to the computer system 240. Alternatively, in some embodiments, the configuration may be different; for example, as indicated above, the display device 220 and/or the computer system 240 may include a USB hub (e.g., passively or actively powered). Correspondingly, in one embodiment, the USB device 100 may couple to the display device 220 which may in turn provide power to the USB device 100. The display device 200 may also provide USB communication between the USB device 100 and the computer system 240 (e.g., the host device 140). Thus, FIGS. 1-3 illustrate exemplary systems for enumeration and/or charging of USB devices.

Embodiments of the Invention

Figure 4:
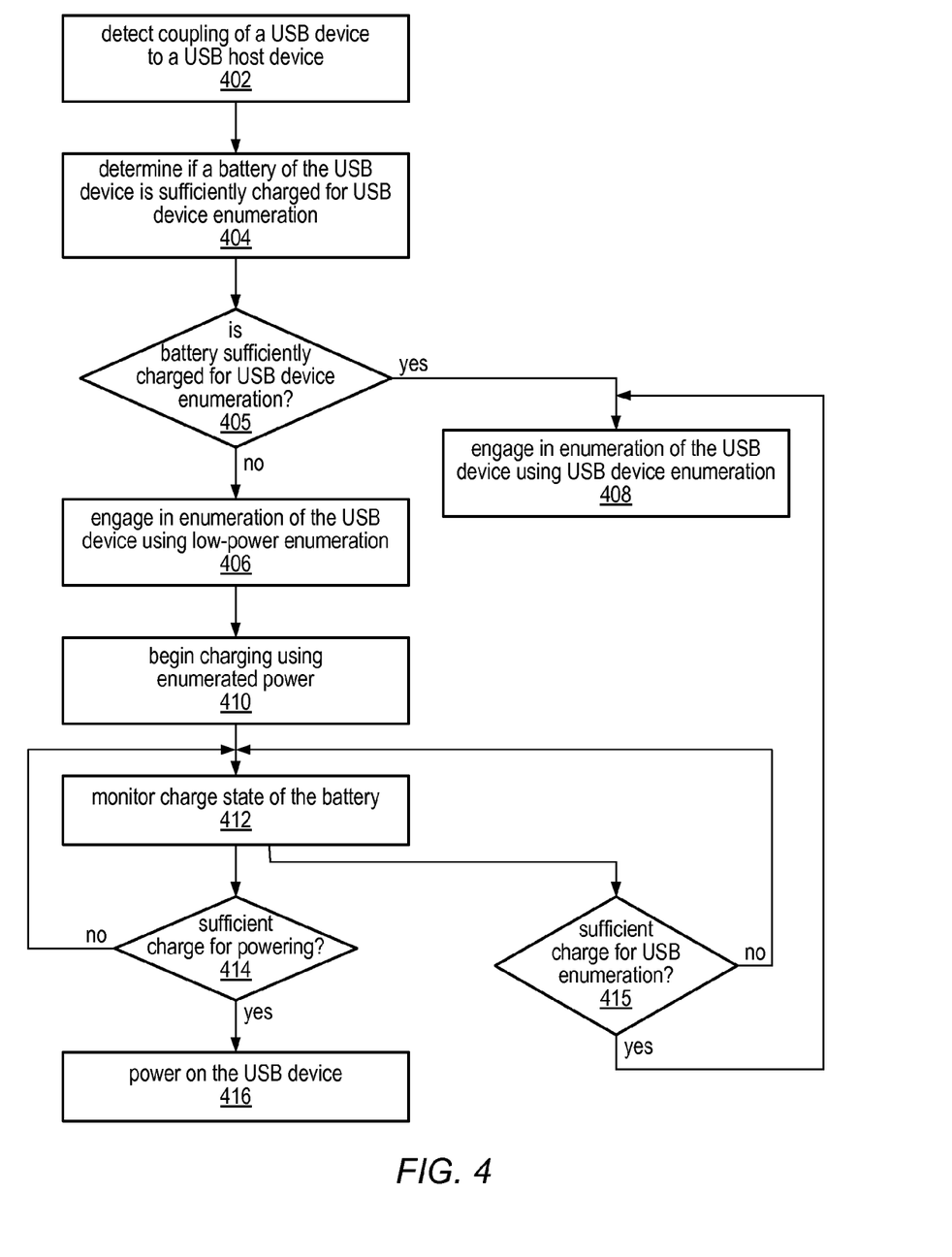
FIG. 4 is a flowchart diagram illustrating one embodiment of a method for enumerating a USB device.
Figure 5:
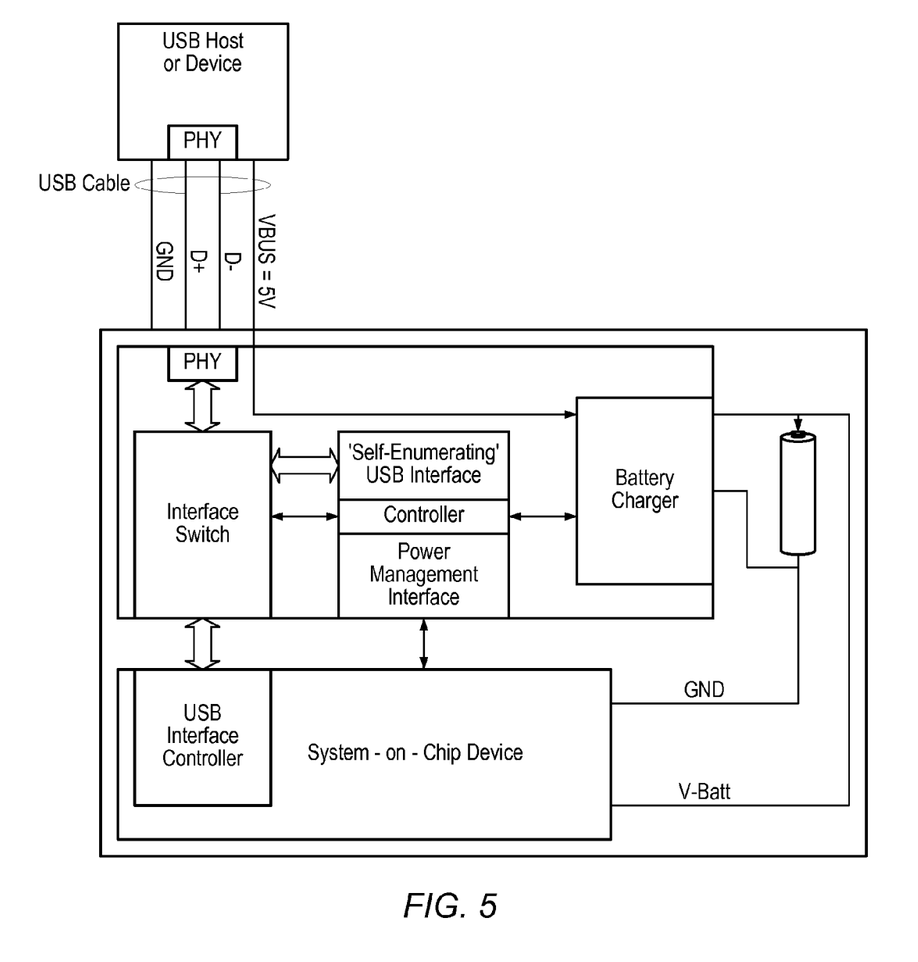
FIGS. 5 and 6 are exemplary block diagrams of a USB device according to one embodiment.
Figure 6:
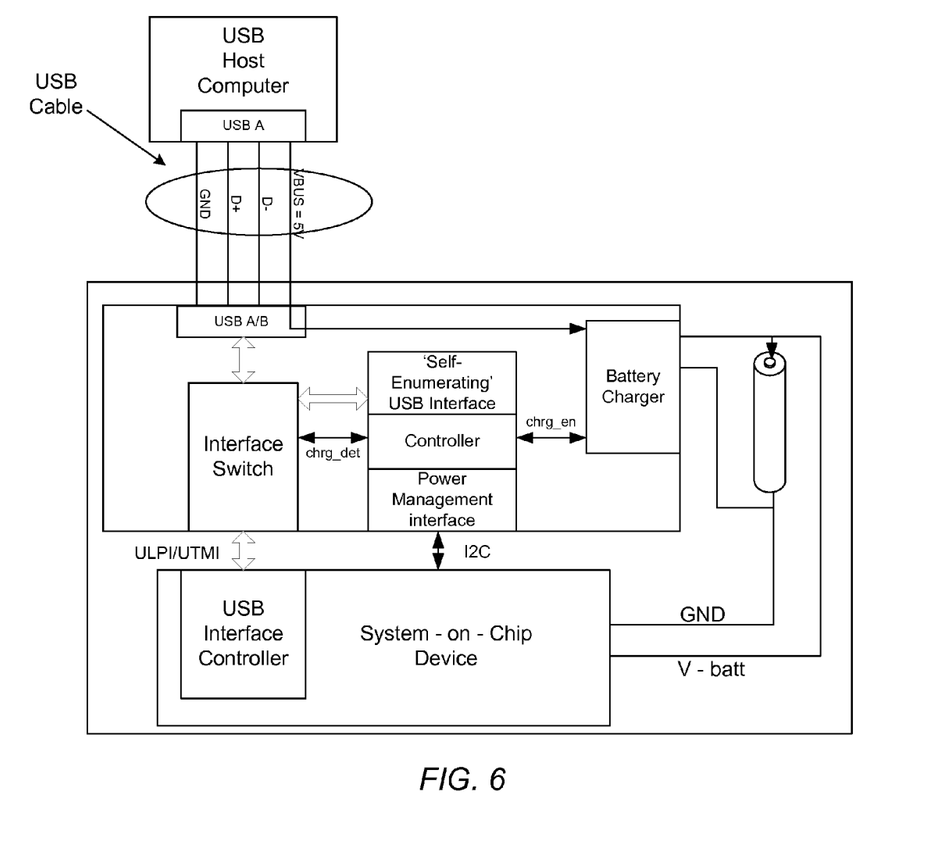
Figure 7:
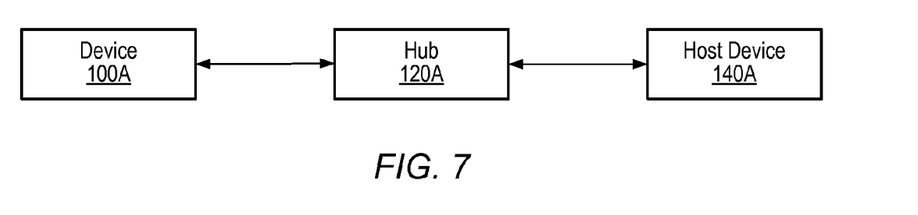
FIG. 7 illustrates an exemplary system suitable for implementing various embodiments of the invention.
Figure 8:
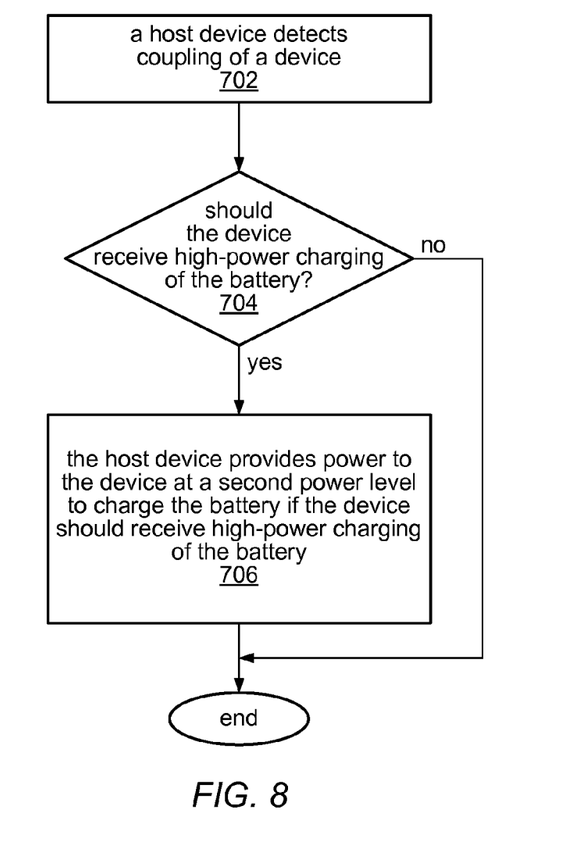
FIG. 8 is a flowchart diagram illustrating one embodiment of a method for charging a USB device.

FIGS. 4-6 illustrate a first embodiment of the invention which operates to determine a charge state of the USB device battery and selectively perform low power enumeration or normal enumeration, as appropriate. FIGS. 7 and 8 illustrate a second embodiment of the invention which operates to perform rapid charging of a USB device. It is noted that the first and second embodiments of the invention may be used separately or together, as desired.

FIG. 4—Flowchart

FIG. 4 illustrates a method for enumerating a USB device using power provided by a host device, e.g., USB host device 140, before enumeration. As used herein, the term "low power" is used to refer to power provided by a host device before enumeration. The method shown in FIG. 4 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, coupling of the USB device 100 to the USB host device 140 may be detected. Thus, in 402, a user may physically attach the USB device 100 to the USB host device 140, and this attachment or coupling may be detected in 402. As indicated above, the USB device 100 may be or couple to any of the devices and systems described above, e.g., the USB hub 120 and/or the host device 140, among others. For example, the USB device 100 may be coupled directly to the USB host device or may be coupled to a USB hub (e.g., a display device including a USB hub) that is in turn coupled to the USB host device (e.g., a computer system), among other configurations. Additionally, in some embodiments, the USB hub 120 may act as the USB host device. In other words, the USB device 100 may simply couple to the USB hub 120 which may have the ability to enumerate the USB device 100, e.g., without coupling to a host device. Furthermore, the USB hub 120 may be an actively or passively powered USB hub, such as those described above, among others. Thus, in various embodiments, the USB device 100, the USB hub 120, and the host device 140 may be any of various systems and may be configured in a number of ways, as desired.

For example, the USB device 100 may be a portable device and/or include a battery, battery charging circuitry, at least one port, detection logic, and/or first circuitry (e.g., low-power enumeration circuitry), among other components (such as those described below, among others). The at least one port may be coupled to the battery and may be operable to couple to the USB host device 140 (and/or other devices), e.g., via a USB cable. In addition, as discussed in greater detail below, after coupling in 402, the USB host device 140 may be operable to charge the battery of the USB device 100, e.g., via power supplied to the port of the USB device 100.

The detection of the coupling of the USB device 100 to the USB host device 140 may be performed via any of numerous appropriate methods. For example, in one embodiment, when the USB device 100 and the USB host device 140 are coupled, a change in the electrical characteristics of the wires connecting the two systems may be detected by one or both of the systems. For example, upon coupling, the resistance in the lines may change, which may be detected by the USB device 100 and/or the USB host device 140. More specifically, in one embodiment, the USB device 100 may detect coupling to the USB host device 140 by detecting provision of power by the USB host device 140, e.g., on a VBUS line in the USB connection.

Additionally, the USB host device 140 may detect coupling of the USB device 100 by detecting a signal transmitted by the USB device 100 to the USB host device 140. This detection may begin an enumeration process which will be described in more detail below. Note that various other processes/detection methods are envisioned other than those described herein. Thus, according to various embodiments, the USB device 100, the USB hub 120, and the USB host device 140 may be one or more of a variety of appropriate devices. Additionally, the coupling between the USB device 100 to the USB host 140 may be detected via a variety of detection methods.

In 404, a charge state of the battery may be determined, e.g., using the detection logic described above. More specifically, the charge state of the battery may be determined by the USB device 100, e.g., using the detection logic included in the USB device 100, as indicated above. In addition, the determination of the charge state of the battery may also include a determination as to whether the battery of the USB device 100 is sufficiently charged for USB device enumeration. As noted above, enumeration refers to the process of a host device establishing communication with the device, e.g., the USB device 100. Enumeration generally occurs through a series of communications between the USB host device 140 and the USB device 100, e.g., in response to an enumeration request by the USB host device 140. Additionally, as used herein, the term "USB device enumeration" is intended to include the enumeration process that occurs when the USB device 100 "normally" enumerates, e.g., when using the device circuitry, e.g., the system-on-chip (SoC) circuitry, of the USB device 100. Thus, one or more components included in the USB device 100, the USB hub 120, and/or the USB host device 140 may determine the charge state of the battery, e.g., whether the battery is sufficiently charged for USB device enumeration.

In 406, if the battery of the USB device 100 is not sufficiently charged for USB device enumeration as determined in 405, the USB device 100 may engage in enumeration using low-power enumeration. As used herein, the term "low-power enumeration" refers to the USB device 100 engaging in enumeration using "low power" provided by the USB host device 140. After this "low-power enumeration" according to one embodiment of the invention, the USB device 100 may begin charging at a higher rate, as discussed further below.

In some embodiments, this enumeration process may be initialized by the detection logic and/or performed by the first circuitry, e.g., low-power enumeration circuitry. Additionally, or alternatively, other components of the USB device 100 may perform one or more of these processes as desired. In some embodiments, the power provided by the USB host device is at a level specified by the USB specification, e.g., 100 milliamps (mA) (e.g., before enumeration). Thus, low-power enumeration (e.g., using the first circuitry and/or associated circuitry) may operate to enumerate the USB device 100 with respect to the USB host device by only using the power provided by the USB host device before enumeration, e.g., approximately 100 mA (or less).

Effectively, this may allow the USB device 100 to begin charging the battery (as shown in 410 of FIG. 4) even when the battery is "dead", e.g., when the charge state of the battery is too low for powering up the device circuitry or SoC circuitry included in the USB device 100. As indicated above, the device circuitry/SoC circuitry may be used to engage in normal enumeration, e.g., the USB device enumeration described above. In some embodiments, the charging may be performed by battery charging circuitry included in the USB device 100. In some embodiments, the battery charging circuitry may charge the battery of the USB device 100 using power received from the host USB device 140. Thus, according to various embodiments, the USB device 100 may charge the battery using power provided by the USB host device 140 after enumeration, e.g., normal or low power enumeration (among others). According to the current USB specification, after enumeration of the USB device 100, the power provided by the USB host device 140 may be supplied at a level higher than the power level provided by the USB host before enumeration, e.g., approximately 500 mA (or less) as compared to the approximately 100 mA supplied before enumeration.

Thus, using the low-power enumeration circuitry (e.g., the first circuitry), the battery of the USB device 100 may be charged much more rapidly than those USB devices that do not include this circuitry. More specifically, the USB device 100 may not have to charge the battery at 100 mA and continually attempt to power on and enumerate with respect to the USB host device 140 as many previous systems generally do. More specifically, these older systems generally cyclically attempt to power on the device until the charge state is sufficiently high enough for normal enumeration (which may take a comparatively longer length of time). Thus, the low-power enumeration allows the USB device 100 to begin effective charging immediately after connecting the USB device 100 to the host device 140 and correspondingly provide lower charging times for the user.

USB communications may generally occur at 3 different speeds, low speed, full speed and high speed. In some embodiments, the first circuitry, e.g., the low-power enumeration circuitry, may enumerate at full speed or low speed instead of high speed to maximize the amount of power available for battery charging. For example, even if the device is normally a high speed USB device, the low-power enumeration circuitry may engage in enumeration at low or full speed. This may allow the USB device 100 to use more power for battery charging. More specifically, when enumerated for high-speed, the USB device 100 may have to use approximately 80 mA for communications as opposed to approximately 25 mA at low or full speed. Thus, the USB device 100 may enumerate at lower speeds to allow for more current to charge the battery of the USB device 100, e.g., approximately 55 mA. However, it should be noted that the low-power enumeration circuitry may be operable to engage in enumeration at high speed; in other words, the low-power enumeration circuitry may engage in enumeration at full, low, and/or high speed, among others.

As indicated above, if the battery of the USB device 100 is sufficiently charged for USB device enumeration, in 408, the USB device 100 may engage in enumeration using normally powered enumeration, e.g., via the detection logic. Said another way, the detection logic may determine if the charge state of the battery is sufficient for the battery to power on the USB device 100 and allow the USB device 100 to engage in normal enumeration. For example, an IPOD™ may engage in USB device enumeration, e.g., "normal" enumeration, when sufficiently charged and coupled to a computer system via a USB cable. More specifically, the battery may be charged sufficiently to power on the device circuitry of the IPOD™ which may in turn engage in enumeration with the computer system 240, e.g., to perform music updates or software updates, among other tasks. Similar remarks as above also apply to other USB devices, e.g., cell phones, video players, peripheral devices, etc. Thus, USB device enumeration may occur when the battery is sufficiently charged.

Thus, according to various embodiments, the USB device 100 may engage in low-power enumeration when the battery is low and engage in normal enumeration when the battery is sufficiently charged, thereby allowing for minimum charging times for the battery of the USB device 100. Said another way, the USB device 100's ability to engage in low-power enumeration when USB device enumeration is impossible may allow for faster charging of the USB device 100. However, it should be noted that in some embodiments, the USB device 100 may not be usable with respect to the USB host device 140 until normal enumeration is performed.

In some embodiments, as shown in 412 of FIG. 4, the method may further include monitoring or detecting the charge state of the battery during charging, e.g., when the USB device 100 previously engaged in low-power enumeration. More specifically, the USB device 100, e.g., using the detection circuitry, may determine whether the USB device 100 is sufficiently charged to engage in normal enumeration, e.g., in 415. In various embodiments, this determination may be performed continuously or periodically throughout the charging process, among other times/methods, as desired.

Upon detection of sufficient charge, the USB device 100 may engage in USB device enumeration in 408, e.g., normal enumeration, thereby allowing the user to use the device for normal operation while being charged using enumerated power. In some embodiments, this monitoring and normal enumeration may be performed in response to input indicating the need for normal enumeration, e.g., user input. The user input may be direct user input requesting that the device be powered on or indirect user input where the user interacts with programs on the host device 140 or the USB device 100 which indicates that the USB device 100 needs to perform normal tasks. However, in alternate embodiments, this process may be performed automatically, e.g., without any input (or user input) at all. Thus, according to various embodiments the USB device 100 may engage in normal enumeration upon sufficient charging of the battery of the USB device 100.

After USB enumeration completes, the method may also include charging the battery of the USB device 100, e.g., using the battery charging circuitry, using normal enumerated power, e.g., at least a portion of the power supplied by the host device 140 after USB device enumeration. Thus, the user may operate the USB device 100, e.g., via the functions of the device, while the USB device 100 is being charged.

Additionally, or alternatively, in 414, the method may determine whether the battery is sufficiently charged for powering on the USB device 100. Similar to above, this may occur in response to user input, e.g., attempting to use the device, and/or automatically, as determined by circuitry, e.g., the detection circuitry, in the USB device 100. Thus, if the battery is sufficiently charged, the USB device 100 may be powered in 416, and if the battery is not sufficiently charged, monitoring of the charge state may continue in 412. Thus, according to various embodiments, the charge state of the battery may be monitored to determine whether or not to engage in USB device enumeration and/or power on the USB device. Note that in some embodiments, USB device enumeration may require that the USB device be powered on and, correspondingly, determinations 414 and 415 may be equivalent. However, the determinations and methods described above are exemplary only and further embodiments are envisioned.

In some embodiments, the device circuitry may be operable to use at least a portion of the power provided by the host device 140 to power on the USB device 100, e.g., the device circuitry/SoC circuitry. This may allow the user to use the device even when the battery is not charged enough to provide the required power. For example, the user may be operable to connect a cell phone, e.g., one with a battery which is substantially depleted, to the host device 140 and make a call substantially immediately, e.g., without having to wait for the battery of the phone to charge to a sufficient charge level. The cell phone may be any of various appropriate cell phones; for example, the cell phone may be a flip-phone, one with a key entry pad and an LCD, e.g., a BLACKBERRY™, or other type of cell phone, as desired. Thus, according to some embodiments, the USB device 100 may be able to utilize at least a portion of the power provided by the host device 140, e.g., to perform functions of the USB device 100. Similar to descriptions above, this process may be invoked in response to various inputs, e.g., user input, and/or automatically.

Thus, according to various embodiments, the USB device 100 may be enumerated using USB device enumeration and/or low-power enumeration as desired. Additionally, after low-power enumeration the battery of the USB device 100 may be charged using power provided by the host device 140 in a USB specification compliant manner.

FIGS. 5 and 6—Exemplary Block Diagrams

FIGS. 5 and 6 are exemplary block diagrams of USB systems where the USB device 100 is operable to engage in low-power enumeration as described above with respect to FIG. 4. These systems may be implemented according to various ones of the systems and methods described above; additionally, the methods and systems described above may also be used in according to the descriptions below. Note that the block diagrams of the USB systems are exemplary only; in other words, various ones of the blocks may be added, omitted, or modified as desired. Additionally, further embodiments are envisioned besides those described herein.

FIG. 5 illustrates one embodiment of a USB device coupled to a USB host or device, e.g., the host device 140 described above. As shown, the host device 140 and the USB device 100 may be coupled via a USB cable, e.g., including a ground (GND), D+ (DP), D− (DM), and VBUS connections/lines. Additionally, as described above, the USB device 100 may be any of numerous USB devices, e.g., cell phones, music players, video players, and/or peripheral devices, among others. The USB device 100 may include a USB physical layer (PHY) (e.g., the at least one port), a self-enumerating USB interface (e.g., the first circuitry/low-power enumeration circuitry), an interface switch, a controller, a power management interface, an SoC device, and a battery charger, e.g., included in a single device. However, it should be noted that various ones of the components may be included in the system as discrete devices instead of being embodied in one device. Said another way, the particular arrangement and configuration illustrated in FIGS. 5 and 6 are exemplary only and other embodiments are envisioned. Additionally, the USB device 100 may include an SoC that contains a USB interface controller.

As indicated above, if the battery maintains sufficient charge to power the device circuitry/SoC, then the self-enumerating interface may not be enabled. Instead, the SoC may use the USB PHY to establish communication with the USB host in hi-speed, full speed, and/or low speed. Once enumerated and enabled, the USB device 100 may signal, e.g., via the power management interface, to the controller that the battery charger may use VBUS (e.g., power supplied by the host device 140) to charge the battery.

Alternatively, as also indicated above, if the battery is not sufficiently charged to power the SoC, the controller may be aware that the SoC is unable to activate its USB interface, e.g., in response to power management signals or the lack thereof. Correspondingly, the interface switch may route the PHY signals to the self-enumerating interface. The self-enumerating interface may establish communication with the host device 140 and once enumerated and enabled, it may notify the controller to enable the battery charger, e.g., to utilize the VBUS power to re-charge the battery. Upon charging, as indicated above, the power management interface may enable the SoC to power up for the user, e.g., in the case of a cell-phone, to place a call. As indicated above, the USB device 100 may be able to consume up to 500 mA from VBUS and remain compliant with the USB specification.

FIG. 6 illustrates an alternate embodiment of the USB system. As shown, FIG. 6 may include similar components as FIG. 5, among others. For example, the cable coupling the host device 140 and the device may include ID, GND, DP, DM, and VBUS connectors/lines. Additionally, the USB device 100 may include a USB PHY, e.g., with a self-enumerating USB interface, a USB high speed multiport link, a battery, a power management interface chip (PMIC), and/or other connections, e.g., 12C, sleep_b, usb charger detection, VDD, GND, etc. In this exemplary embodiment, the PHY, e.g., including a universal low pin interface (ULPI) or USB transceiver macrocell interface (UTMI), may include logic to enable detection of external chargers, e.g., USB chargers. Additionally, the PHY may operate with the PMIC to implement full or low speed data rates, e.g., to secure additional charging capability by use of an embedded switch included in the PHY, e.g., the self-enumerating PHY. In some embodiments, the sleep_b input may allow the PHY to ignore the SoC host link interface. More specifically, when sleep_b is high, e.g., asserted high, the SoC may use the ULPI/UTMI interface to control the PHY and/or the PMIC via a 12C port on the PHY.

Additionally, an ID pin may be used for additional charging functions. The PHY may determine the resistance to ground on ID. In a basic case, the ID may be used to determine if the USB host (or device) is attached. In one embodiment, for a carkit charger, e.g., a CEA carkit charger, this ID pin may be used in a five-wire carkit to determine charging current rates, e.g., to be used by the USB device 100 to charge the battery of the USB device 100.

Thus, FIGS. 5 and 6 (as well as the previous Figures) present exemplary systems and methods that may implement a USB compliant interface in any state of battery charge. More specifically, the USB device 100 may enumerate and begin battery charging even when the battery is "dead".

FIG. 7—Exemplary System for Rapidly Charging a USB Device

Similar to FIG. 1, FIG. 7 illustrates one embodiment of an exemplary system operable to charge the battery of device 100A. As shown, the device 100A may be coupled to host device 140A, e.g., via hub 120A.

Similar to descriptions above, the device 100A may be the USB device 100, e.g., a cell phone, a music or video player, a peripheral device, and/or other devices described herein, among others. In some embodiments, the host device 140A may be similar to the host device 140, e.g., including various computer systems (e.g., the computer system 240), other devices, etc. Additionally, similar to descriptions above, the hub 120A may take on a variety of forms, e.g., actively powered USB hubs, possibly included in various devices such as display devices (e.g., cathode ray tube (CRT) monitors, liquid crystal display (LCD) screens, plasma screens, etc.). In some embodiments, the hub 120A may be an internal actively USB hub, e.g., powered by power supplies in a host device (e.g., the computer system 240), an external USB hub, and/or any other type of hub which is operable to provide power in excess of the first power level.

More specifically, in one embodiment, the hub 120A may be powered by a power source, e.g., a power supply of the computer system 240. However, in such embodiments, the power supply of the computer system 240 may not be monitored, e.g., according to the VBUS limits stipulated by the USB specification. This may allow the device 100A to draw power greater than the first power level without the computer system 240 restricting power supplied to the device. For example, in one embodiment, the hub 120A may not be a hub that is passively powered by the motherboard of a computer, but may instead be powered directly from the power supply of the computer system 240, e.g., similar to the powering of hard drives/other devices coupled to the power supply.

Additionally, the hub 120A may include one or more downstream ports, e.g., to couple to one or more devices, relay circuitry operable to relay power from a power source to charge the battery of the device, and/or logic circuitry to determine appropriate device behavior. Thus, according to various embodiments, the device 100A, the hub 120A, and the host device 140A may be any of various appropriate devices such as the USB device 100, the USB hub 120, and/or the host device 140, among other systems/devices.

FIG. 8—Exemplary Method for Charging a USB Device

FIG. 8 illustrates a method for rapidly charging of the device 100A, e.g., the USB device 100. FIG. 8 illustrates one embodiment of a method for rapidly charging the device 100A in the system of FIG. 7. However, the method shown in FIG. 8 may be used in conjunction with any of various types of devices or systems, such as the USB systems or devices shown in the above Figures, among others. In various embodiments, some of the method elements shown may be performed concurrently, in a different order than shown, or may be omitted. Additional method elements may also be performed as desired. As shown, this method may operate as follows.

In 702, coupling of device 100A may be detected, e.g., to hub 120A. In some embodiments, the detection may be performed by the hub 120A and/or by the device 100A, e.g., using logic circuitry included in one or both of the device 100A and the hub 120A. Similar to above, the detection may be performed by detecting various electrical changes in circuits, e.g., changes in resistance in the line of the cable connecting the device and the hub. For example, the device 100A may detect the coupling by detecting the provision of power on the VBUS line by the host device 140A. Additionally, the host device 140A may detect the coupling of the USB device 100A by detecting a signal transmitted by the device 100A. However, as also described above, the described methods for detection are exemplary only and other methods are envisioned.

Similar to above, the device 100A may be a USB device (e.g., the USB device 100), may include a battery, at least one port, and logic circuitry (described in more detail below), and may adhere to a first standard, e.g., the USB specification. In some embodiments, the first standard may specify provision of maximum power to the device at a first power level. The first power level may be approximately 500 mA or less, e.g., supplied to the device 100A after enumeration.

Additionally, as indicated above, the logic circuitry may be operable to detect coupling of the device to the hub 120A, among other tasks, such as those described herein and others. Thus, according to various embodiments, coupling of the device, e.g., to a hub, may be detected; additionally, the device 100A and the hub 120A may be any of numerous appropriate systems, such as those described above, among others.

In 704, the method, e.g., the device 100A and/or the hub 120A (e.g., using the logic circuitry of one or both of the device 100A and the hub 120A), may determine whether the device should receive high-power charging of the battery. The determination may be performed by detecting a charge state of the battery. Where the battery is sufficiently "dead" or too low to power on the device, the device may request or be in need of high-power charging. Note that because the battery is dead, the device 100A may make the described determinations and produce signals using power provided by the hub 120A, e.g., using the VBUS line in the USB cable.

However, other conditions, e.g., other than depletion of the battery, may be used to determine whether the device/battery of the device 100A should receive high-power charging. For example, the user may choose an option, e.g., on the device 100A and/or the hub 120A which indicates that the device 100A should be charged using high-power. Alternatively, or additionally, the device 100A may automatically determine that the device 100A should receive high-power charging, e.g., according to various states of the device 100A, including, for example, state of charge of the battery, whether the device 100A is powered on, usage statistics of the device 100A, whether the device 100A is currently in use, or other variables/conditions. Thus, in some embodiments, this determination may be made by the device 100A and/or the hub 120A, e.g., in response to input and/or automatically.

Where the device 100A should receive high-power charging as determined by 704, the device 100A may send a signal to the hub requesting high power charging, e.g., by using a pullup or pulldown resistor and/or changing the current of one or more connections between the device 100A and the hub 120A. Accordingly, the hub 120A may respond to the signal with its own, e.g., such as those described above, among others, indicating that the hub 120A is capable of high power charging. Additionally, the hub 120A may not begin the enumeration process with the device 100A in order to allow high-power charging (e.g., charging the device using power greater than the first power level, e.g., 500 mA).

More specifically, in one exemplary embodiment, the device 100A may request and/or receive power according to the following signaling process. Note that many other processes may be implemented other than the descriptions below. Said another way, the example processes described herein are exemplary only and are not intended to limit the scope of the invention in any way whatsoever. The following descriptions may also apply to FIG. 9, which is described in more detail below. Initially, the device 100A, which may require high power charging, may assert a pullup, e.g., a 100K pullup to 3.3 volts (V), which may be generated from VBUS. The hub port may include pulldowns, e.g., 15K pulldowns, on the DP and DM lines of the USB connection. The device 100A may thus provide bias on DP, e.g., 430 millivolts (mV) of bias, which may be below the threshold used in normal USB signaling, e.g., 800 mV.

Figure 9:
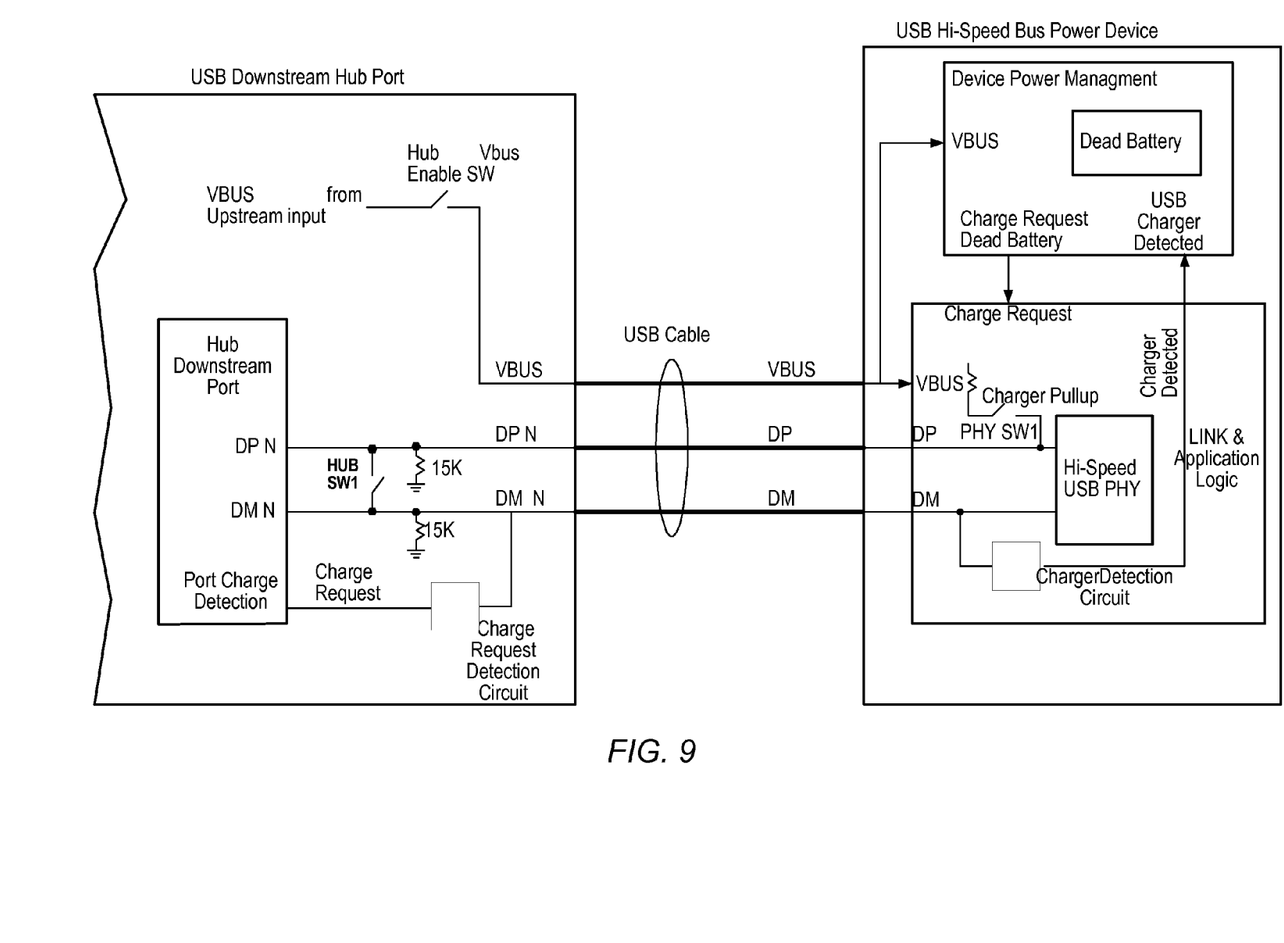
FIG. 9 is an exemplary block diagram of a system operable to perform high-powered USB charging according to one embodiment.

Correspondingly, the hub 120A may sense this voltage on the DP line. In response, the hub 120A may short the DP to the DM line of the USB connection, e.g., to inform the device 100A requesting high-power charging that the device is coupled to a charger, e.g., a USB charger. As indicated above, the hub 120A may not begin enumeration of the device 100A because the measured mV is not the normal "expected" voltage (e.g., 430 mV instead of the normal 1.5K pullup). Said another way, the hub 120A may not inform the host device 140A (e.g., if the hub 120A is coupled to the host device 140A) that the device 100A is coupled to the hub 120A, e.g., to avoid the operating system detecting and/or notifying the user that the USB device 100A did not enumerate and is drawing current.

Thus, according to various embodiments, the device 100A and the hub 120A may operate to signal to each other that they require and/or are operable to provide high-power charging. Upon communicating this information, in 706, power may be provided to the device 100A at a second power level to charge the battery. Note that during this process as well as during high-power charging, the device 100A may not be enumerated, e.g., so that the host device 140A is "unaware" of its presence. This provision of power may be supplied based on the determination described above, e.g., whether the device 100A should receive high-power charging. Additionally, the second power level may be greater than the first power level, e.g., greater than 500 mA. Said another way, the high-power charging may include charging the battery of the device 100A using power levels greater than the enumerated power levels described in the USB specification. In some embodiments, the second power level may be approximately 1.5 amps (A).

Alternatively, the second power level may be any level above the first power level, e.g., according to how much power is available to the hub. For example, the hub 120A may be a display device (or other externally powered hub) which is separately powered from a power source, e.g., a wall socket. Accordingly, the hub 120A may not enumerate the device with respect to the host device 140A and may supply power from the power source to the device 100A to charge the battery of the device 100A. As indicated above, the hub 120A may provide as much power is available, e.g., the available power that is in excess of the power used by the hub to perform other duties, to the device. Said another way, where the hub 120A is a display device, the display device may draw power to act as a hub and to display video signals from the host device 140, e.g., the computer system 240. The display device may provide any excess power, above that amount, to the device to charge the battery.

However, in some embodiments, the hub 120A may provide power as specified by the device 100A coupled to the hub 120A. In other words, the hub 120A may supply as much power as the device 100A is operable to receive. Alternatively, the device 100A may request a specific power level or power range, and the hub 100A may provide power to the device accordingly. Thus, according to various embodiments, power in excess of the first power level may be provided to the device 100A. More specific examples on the operation of the device 100A and hub 120A are provided below with respect to FIG. 9.

In some embodiments, similar to descriptions above, the method may include monitoring the charge state of the battery, e.g., periodically or continuously, among other methods. When the charge state of the battery reaches sufficient levels for enumeration, the device may initiate an enumeration request, e.g., with the hub 120A and/or the host device 140A. This enumeration may allow the device to be used and charged at the first power level, e.g., approximately 500 mA. Similar to above, this enumeration may occur automatically, e.g., without any input from the user, upon input from the user or otherwise, or not at all, among other scenarios, as desired. Thus, according to various embodiments, where the device is sufficiently charged, the device 100A may be enumerated with respect to the host device 140A when available.

Additionally, or alternatively, the method may include monitoring the charge state of the battery to determine whether the charge state is sufficient to power on the device 100A. Similar to above, this may be done in response to user input or automatically, among other methods, as desired. Additionally, in some embodiments, similar to above, monitoring the charge state for powering on the device/enumerating the device may be substantially the same power level/method for monitoring. Thus, according to various embodiments, the charge state of the battery may be monitored to determine whether the device 100A can be powered on and/or enumerated. Correspondingly, the device 100A may be powered on and/or enumerated as desired.

Additionally, also similar to descriptions above, the device 100A may be operable to use a portion of the power supplied by the hub 120A to power on the device 100A, e.g., the SoC or device circuitry of the device 100A. This may be performed automatically or in response to input as desired. For example, where the device 100A is a music player, the user may be able to turn on the device and play music, e.g., even during high-power charging. Thus, at least a portion of the power provided by the hub 120A may be used to operate the device 100A. Note that any remaining power may be used to continue to charge the battery, among other uses.

If the device 100A should not receive high-power charging, e.g., as determined by the device 100A and/or the hub 120A (among others), the device 100A may be enumerated with respect to host device 140A. Similar to descriptions above, the battery of the device 100A may still be charged when enumerated, but possibly at a lower power level, e.g., the first power level. In some embodiments, the logic circuitry of the device 100A may initiate the enumeration of the device 100A, e.g., after determining if the device 100A requires enumeration and/or power for charging of the battery. Correspondingly, after enumeration, the logic circuitry may also initiate battery charging of the battery using enumerated power, e.g., at the first power level. Thus, where the device 100A does not need high-power charging, the hub 120A and the device 100A may conjunctively operate to perform enumeration, e.g., with respect to the host device 140A.

Thus, according to various embodiments, a device may be charged using high-power by a hub as desired.

FIG. 9—Exemplary Block Diagram

FIG. 9 is an exemplary block diagram of a system operable to implement high-power charging. This system may be implemented according to various ones of the systems and methods described above; additionally, the methods and systems described above may also be used in according to these descriptions. More specifically, the block diagram of the system is exemplary only; in other words, various ones of the blocks may be added, omitted, or modified as desired. Additionally, further embodiments are envisioned besides those described herein.

As shown, the hub 120A, e.g., a port of the hub 120A, may be coupled to a USB hi-speed device, e.g., via a standard USB cable with VBUS, DP, and DM lines. Additionally, the hub port may include VBUS from upstream input, a hub VBUS enable switch, a charge request detection circuit, a port for charge detection, a hub switch, and/or other resisters/sinks. Also, as shown, the device 100A may include device power management, e.g., including detection logic for the battery, a hi-speed USB PHY, link and application logic, a charger detection circuit, and various other connection lines resistors and switches. As indicated above, the particular components described and illustrated in FIG. 9 are exemplary only and other components/modifications are envisioned.

In one embodiment, these two systems may act as follows. The USB Bus power device management integrated chip may request a charge by asserting a change request output which may drive the USB PHY's charge request input. The charge request assertion may in turn cause the PHY's SW1 to place a 100K pullup to 3.3 V on the DP input if the VBUS is present. It should be noted that the voltage for the pullup is generated from VBUS because the battery may be dead or in a low charge state. Additionally, any logic in the PHY may use the VBUS as a power source for these procedures.

In the hub downstream port, shown in FIG. 9, the charge request detection circuit may detect the pull up on the DM line and close the device SW1, e.g., via the port for charge detection, which may in turn short the downstream outputs DP to DM. Correspondingly, the USB device 100 may then see the pullup on DP on the DM line and go into charging mode. Additionally, the USB device 100 may not assert the 1.5K pullup on DP in response to the hub 120A's short (described above). In some embodiments, the comparator on the hub downstream port may only be enabled every few seconds (or other appropriate intervals) to conserve power in the hub. Additionally, the hub 120A may not inform the upstream host 140A that a charging event is occurring, thereby preventing the host device 140A, e.g., the operating system of the host device 140A, from requesting that the VBUS be limited or removed for the device 100A. Additionally, it should be noted that because the voltage on the DM line may be below 800 mV, the hub 120A may not enumerate the downstream port, which may allow the port to source greater than 100 mA to the device 100A, as indicated above.

Thus, according to various embodiments, the device and/or the hub may be operable to engage in high-power charging, e.g., to quickly charge the battery of the device.

Further Embodiments

In the foregoing descriptions above, the device 100A (e.g., the USB device 100) may be operable to engage in low-power enumeration and/or initiate high-power charging, e.g., when the battery of the device is sufficiently low or "dead". In some embodiments, the device 100A, the hub 120A, and/or the host device 140A may operate together to include one or more of these features in one system. For example, in one embodiment, the device 100A may include both the low-power enumeration circuitry and the high-power charging circuitry as well as logic to coordinate these two logics. Additionally, the host device 140A and/or the hub 120A may include circuitry which allows the device 100A to enumerate normally, with low-power, or request high-power charging seamlessly, e.g., without complications as viewed by the user.

In some embodiments, the type of enumeration and/or charging may be determined by default or factory settings supplied by the device and/or by choices made by the user, among other methods. In preferred embodiments, the device 100A (and/or the hub 120A/host device 140A) may automatically handle the specific situations and choose an appropriate mode, e.g., according to hardware or programming of the device(s). Thus, in some embodiments, the user may plug in a device, and depending on environmental situations, (e.g., charge state of the battery, whether the device needs to be used, etc.) the device and/or the hub/host device may determine whether the device should be enumerated using USB device enumeration or low-power enumeration and/or charged using high-power charging. Note that if the device is enumerated, the battery may still be charged according to a standard, e.g., the USB specification.

In other words, the device 100A may include the device circuitry, e.g., the SoC, the battery, the at least one port, and the logic circuitry described above, but may also include low-power enumeration circuitry and logic associated with managing switching of the low-power enumeration circuitry, e.g., switching circuitry included in the logic circuitry.

Thus, according to various embodiments, the systems described herein may include various circuitry such as those described above (among others) to incorporate low-power enumeration and high-power charging into the functionality already provided by common portable devices.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for charging a device, comprising:
a hub detecting coupling of the device, wherein the device comprises a battery;
the hub determining if the device should receive high-power charging of the battery, wherein determining if the device should receive high-power charging is based on a request received from the device when the device should receive the high-power charging;
the hub receiving power from a power source other than a host device;
the hub providing power to the device at a first power level to charge the battery if the device should receive the high-power charging of the battery, wherein the first power level is greater than a maximum enumeration power level, wherein, prior to and during charging, the device is not enumerated, and wherein at least a portion of the power at the first power level is provided from the power source; and
if the device should not receive high-power charging of the battery, the hub enumerating the device with respect to the host device and providing power to the device at a second power level lower than the first power level.

2. The method of claim 1, wherein the device comprises a universal serial bus (USB) device.

3. The method of claim 1, wherein the device enumeration conforms to the universal serial bus (USB) 2.0 specification.

4. The method of claim 1, wherein the hub is a universal serial bus (USB) hub.

5. The method of claim 1, wherein said determining if the device requires the high-power charging comprises detecting a specified voltage or current from the device.

6. The method of claim 1, wherein the first power level is above a current of 500 milliamps (mA).

7. The method of claim 1, further comprising:
the hub sending a signal to the device indicating that the device is coupled to a charging device after detecting coupling of the device.

8. The method of claim 1, where said determining if the device should receive the high-power charging comprises determining if the battery of the device is unable to power the device.

9. A universal serial bus (USB) hub, comprising:
one or more downstream ports, operable to couple respectively to one or more downstream USB devices;
logic circuitry coupled to the one or more downstream ports; and
power circuitry coupled to the logic circuitry, wherein the power circuitry is configured to receive power from a power source other than a host device coupled to the USB hub;
wherein the logic circuitry is operable to:
detect coupling of a USB device to a downstream port of the one or more downstream ports, wherein the USB device comprises a battery; and
determine if the USB device should receive high-power charging of the battery, wherein determining if the USB device should receive high-power is based on a request received from the USB device when the USB device should receive the high-power charging; and
wherein the power circuitry is operable to provide power to the USB device at a first power level to charge the battery if the logic circuitry determines that the USB device should receive the high-power charging of the battery, wherein the first power level is greater than a maximum enumeration power level, wherein, prior to and during the high-power charging, the USB device is not enumerated, and wherein at least a portion of the power at the first power level is provided from the power source; and
wherein the power circuitry is operable to enumerate the USB device with respect to a host device if the logic circuitry determines that the USB device should not receive the high-power charging.

10. The USB hub of claim 9, wherein the power circuitry is further operable to:
provide power to the USB device at an enumeration power level to charge the battery after enumeration.

11. The USB hub of claim 9, wherein the logic circuitry is further operable to send a signal to the USB device indicating that the USB device is coupled to a USB charging device.

12. A method for charging a universal serial bus (USB) device, comprising:
a hub detecting coupling of the USB device, wherein the USB device comprises a battery;
the hub charging the battery of the USB device at high power if the USB device requests high-power charging, wherein the high power is in excess of a maximum power level that would be provided to an enumerated USB device, wherein, prior to and during said charging, the USB device is not enumerated, and wherein at least a portion of the high power is provided from a power source that is separate from power provided from a host device; and
the hub charging the battery of the USB device at enumerated power if the USB device does not request high-power charging, wherein at least a portion of the enumerated power is provided from the host device.

* * * * *